US010240618B2

(12) United States Patent
Beales et al.

(10) Patent No.: US 10,240,618 B2
(45) Date of Patent: Mar. 26, 2019

(54) ACCUMULATOR VOLUME DETECTOR USING AN OPTICAL MEASUREMENT

(71) Applicant: Hydril USA Distribution LLC, Houston, TX (US)

(72) Inventors: Thomas David Beales, Houston, TX (US); Michael James Connor, Jr., Houston, TX (US)

(73) Assignee: Hydril USA Distribution LLC, Houston, TX (US)

( * ) Notice: Subject to any disclaimer, the term of this patent is extended or adjusted under 35 U.S.C. 154(b) by 80 days.

(21) Appl. No.: 15/171,692

(22) Filed: Jun. 2, 2016

(65) Prior Publication Data

US 2016/0356290 A1 Dec. 8, 2016

Related U.S. Application Data

(60) Provisional application No. 62/170,446, filed on Jun. 3, 2015.

(51) Int. Cl.
| | |
|---|---|
| *F16D 31/02* | (2006.01) |
| *F15B 1/04* | (2006.01) |
| *F15B 1/24* | (2006.01) |
| *E21B 41/00* | (2006.01) |

(Continued)

(52) U.S. Cl.
CPC ............ *F15B 1/04* (2013.01); *E21B 41/0007* (2013.01); *F15B 1/022* (2013.01); *F15B 1/24* (2013.01);

(Continued)

(58) Field of Classification Search
CPC .................. F15B 1/033; F15B 15/2876; F15B 2201/515; G01B 11/14

(Continued)

(56) References Cited

U.S. PATENT DOCUMENTS 6,484,620 B2 * 11/2002 Arshad ............... F15B 15/2876
91/1
6,769,349 B2 * 8/2004 Arshad ................. G01S 7/4818
91/1

(Continued)

FOREIGN PATENT DOCUMENTS

DE        10137988 A1    2/2003
DE    202008004940 U1    8/2009

(Continued)

OTHER PUBLICATIONS

Stuhler, "The Challenge of Subsea Position Sensing", Subsea hydraulic accumulator charge sensing for piston accumulators, pp. 1-4, Aug. 28, 2015.

(Continued)

*Primary Examiner* — Michael Leslie
(74) *Attorney, Agent, or Firm* — Hogan Lovells US LLP

(57) ABSTRACT

A laser piston position sensor for determining the position of a piston within an accumulator, the laser piston position sensor configured to attach to an end of the accumulator, and the accumulator having an aperture in the end thereof exposing the piston within the accumulator to the laser piston position sensor. The laser piston position sensor including a sensor housing enclosing a cavity containing a low pressure gas, and defining an opening from the cavity toward the accumulator, a laser sensor positioned within the cavity for emitting a laser toward the piston of the accumulator via the opening in the sensor housing and the aperture in the accumulator, and a transparent lens positioned between the laser sensor and the accumulator to allow passage of the laser from the laser sensor to the piston, and to separate gases in the accumulator from gases in the cavity of the sensor housing.

18 Claims, 5 Drawing Sheets

(51) Int. Cl.
    *F15B 1/02*     (2006.01)
    *F15B 15/28*     (2006.01)
    *G01F 17/00*     (2006.01)
    *E21B 33/06*     (2006.01)
    *E21B 33/064*     (2006.01)

(52) U.S. Cl.
    CPC .......... *F15B 15/2876* (2013.01); *G01F 17/00* (2013.01); *E21B 33/062* (2013.01); *E21B 33/064* (2013.01); *F15B 2201/31* (2013.01); *F15B 2201/515* (2013.01)

(58) Field of Classification Search
    USPC .................................................. 91/1; 92/5 R
    See application file for complete search history.

(56) References Cited

U.S. PATENT DOCUMENTS

| | | | |
|---|---|---|---|
| 8,047,122 B1 | 11/2011 | Trent et al. | |
| 8,826,988 B2 | 9/2014 | Gray et al. | |
| 9,719,772 B2 * | 8/2017 | Mansell | G01B 11/14 |
| 2014/0123746 A1 | 5/2014 | Jaffrey | |
| 2015/0233398 A1 | 8/2015 | Jaffrey | |
| 2016/0018210 A1 | 1/2016 | Mansell et al. | |

FOREIGN PATENT DOCUMENTS

| | | |
|---|---|---|
| DE | 102011007765 A1 | 10/2012 |
| EP | 0941812 A1 | 9/1999 |
| EP | 2438342 A1 | 4/2012 |
| IT | BO20090588 A1 | 3/2011 |
| WO | WO2015150478 | 10/2015 |

OTHER PUBLICATIONS

"Piston position monitoring", Contactless Monitoring of Piston Position with Ultrasound, pp. 1 and 2, Nov. 21, 2014-Mar. 31, 2016.
International Search Report and Written Opinion issued in connection with corresponding PCT Application No. PCT/US2016/035740, dated Sep. 13, 2016.

* cited by examiner

ACCUMULATOR VOLUME DETECTOR USING AN OPTICAL MEASUREMENT

CROSS-REFERENCE TO RELATED APPLICATIONS

This application claims priority to U.S. Provisional Patent Appln. No. 62/170,446, which was filed on Jun. 3, 2015, the full disclosure of which is hereby incorporated herein by reference in its entirety.

BACKGROUND OF THE INVENTION

1. Technical Field

The present technology relates generally to oilfield equipment. In particular, the present technology relates to hydraulic accumulators for use in oilfield applications.

2. Discussion of the Background

In the drilling industry, hydraulic controls are used for controlling many safety components. In addition, many such components are powered by hydraulic accumulators. To ensure safety, it is desirable to know whether an accumulator will have enough hydraulic fluid to fire a particular safety component. One way to determine the volume of fluid in a hydraulic accumulator is to determine the position of the piston within the accumulator.

Known methods of determining the amount of hydraulic fluid in an accumulator include the use of cable extension transducers, wherein a cable is physically attached to the piston in the accumulator. Based on the amount of cable pulled into the accumulator, the position of the piston in the accumulator can be determined. Use of cable extension transducers can be problematic because they require physical invasion into the accumulator and multiple mechanical parts working together, each of which leads to decreased reliability of the accumulator, and greater maintenance costs.

Another method of determining piston position within an accumulator includes use of acoustic signals transmitted into the accumulator. This method avoids physical intrusion into the accumulator by a cable, but has problems of its own. For example, to accurately determine distance through a medium using acoustic waves, certain properties of the medium must be known, such as temperature and pressure. Thus, temperature and pressure gauges need to be installed within the medium in the accumulator to determine these parameters. The introduction of additional sensors decreases reliability of the system, as well as the accuracy of information obtained regarding position of the piston.

SUMMARY OF THE INVENTION

One embodiment of the present technology provides a hydraulic accumulator for use in powering components of a subsea drilling system, including an accumulator housing enclosing a cavity, the accumulator housing defining an aperture in a first end, and having a longitudinal axis, a piston disposed within the cavity and movable relative to the accumulator housing in a direction parallel to the longitudinal axis, and a laser piston position sensor attached to an end of the accumulator housing adjacent the aperture in the first end. The laser piston position sensor includes a sensor housing enclosing a cavity and defining a recess in an outer surface of the sensor housing, a lens positioned in the recess of the sensor housing, and exposed to the cavity in the sensor housing, the lens positioned between the cavity in the sensor housing and the aperture of the accumulator housing, and a laser sensor attached to the sensor housing in the cavity, that emits a laser directed through the lens and aperture in the accumulator housing to the piston.

Another embodiment of the present technology provides a laser piston position sensor for determining the position of a piston within a hydraulic accumulator, the laser piston position sensor configured to attach to an end of the hydraulic accumulator, and the hydraulic accumulator having an aperture in the end thereof exposing the piston within the hydraulic accumulator to the laser piston position sensor. The laser piston position sensor includes a sensor housing enclosing a cavity containing a low pressure gas, and defining an opening from the cavity toward the hydraulic accumulator, a laser sensor positioned within the cavity for emitting a laser toward the piston of the hydraulic accumulator via the opening in the sensor housing and the aperture in the hydraulic accumulator, and a transparent lens positioned between the laser sensor and the hydraulic accumulator to allow passage of the laser from the laser sensor to the piston, and to separate gases in the hydraulic accumulator from gases in the cavity of the sensor housing.

Yet another embodiment of the present technology provides a method of determining the position of a piston within a hydraulic accumulator. The method includes the steps of emitting a laser from a laser piston position sensor attached to the hydraulic accumulator, directing the laser through an aperture in the hydraulic accumulator to the piston, and receiving reflected light from the piston. The method further includes determining the amount of time between emission of the laser and receipt of the reflected light, then, based on such time, determining the distance between the laser piston position sensor and the piston, and determining a volume of hydraulic fluid within the hydraulic accumulator based on the position of the piston within the hydraulic accumulator and dimensional characteristics of the hydraulic accumulator.

BRIEF DESCRIPTION OF THE DRAWINGS

The present technology can be better understood on reading the following detailed description of nonlimiting embodiments thereof, and on examining the accompanying drawings, in which.

DETAILED DESCRIPTION OF THE PREFERRED EMBODIMENT

Figure 1:
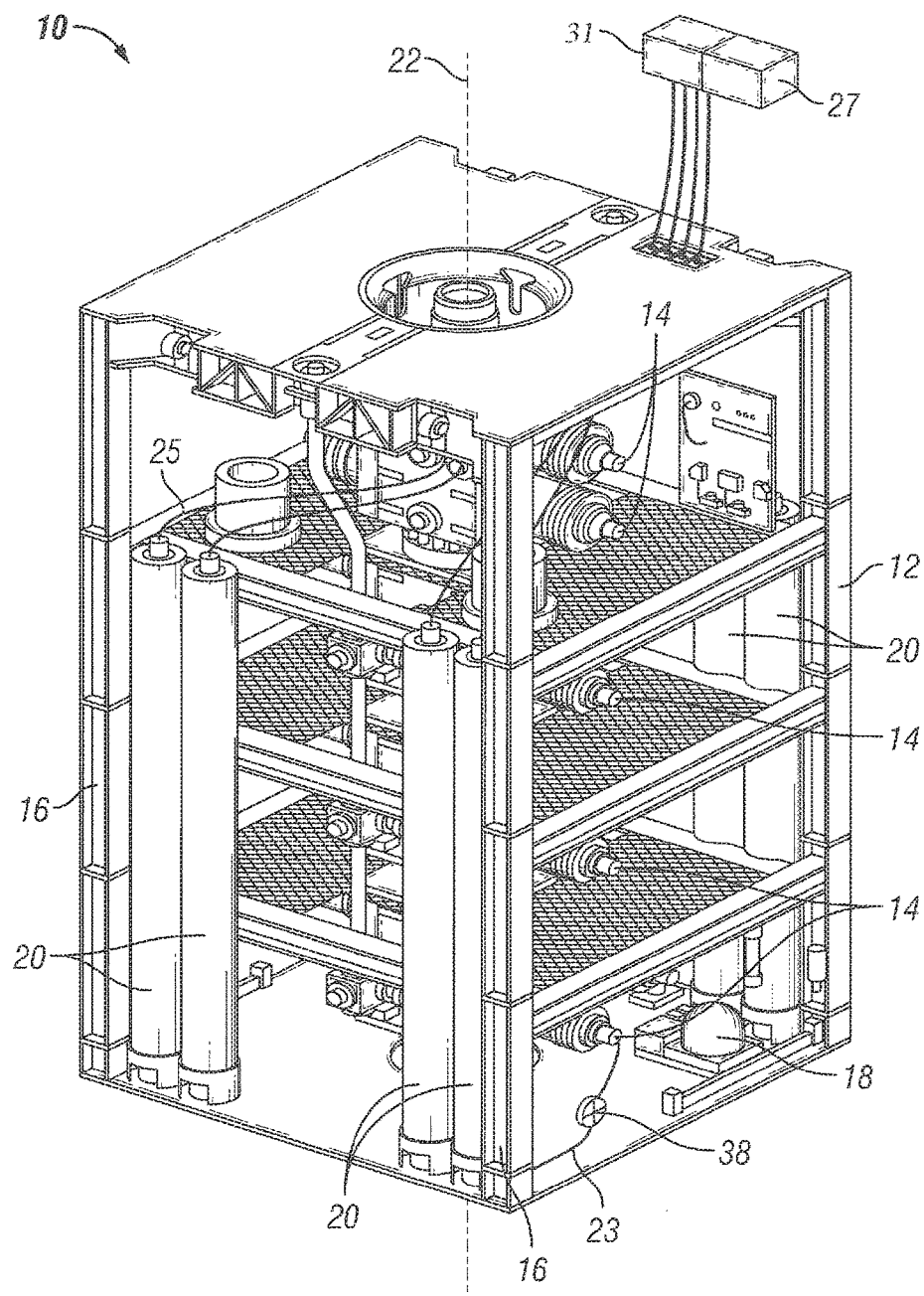
FIG. 1 is perspective view of a lower blow out preventer (BOP) stack, including accumulators and sensors according to an embodiment of the present technology.

The foregoing aspects, features, and advantages of the present technology can be further appreciated when considered with reference to the following description of preferred embodiments and accompanying drawings, wherein like reference numerals represent like elements. The following is directed to various exemplary embodiments of the disclosure. The embodiments disclosed should not be interpreted, or otherwise used, as limiting the scope of the disclosure, including the claims. In addition, those having ordinary skill in the art can appreciate that the following description has broad application, and the discussion of any embodiment is meant only to be exemplary of that embodiment, and not intended to suggest that the scope of the disclosure, including the claims, is limited to that embodiment.

FIG. 1 shows a lower stack 10 of a subsea drilling system. The lower stack 10 includes a frame 12 which supports numerous components, including blow out preventer (BOP) rams 14, cable trays 16, a control pod 18, and accumulators 20. In operation, a drill pipe or production pipe (not shown) passes parallel to the axis 22 of the BOP, through the BOP from the top of the lower stack 10, and through to the wellhead (not shown), located below the lower stack 10. The accumulators 20 are hydraulically attached via hydraulic lines 23 to functions on the lower stack 10, such as, for example the BOP rams 14. One purpose of the accumulators is to provide a force to close the BOP rams 14 if desired, or to fire other functions on the lower stack 10 or lower marine riser package (not shown). The structure of the accumulators that enables this functionality is described in detail below. Each of the accumulators 20 (or each laser piston position sensor 26, shown in FIGS. 2A through 5 and described below) can be attached via cables 25 to a programmable logic controller (PLC) 31 at a remote location, such as, for example, the control pod 18, or on a platform or vessel on the sea surface. In addition, the PLC 31 can be attached to a human machine interface (HMI) display 27, to allow an operator to monitor the accumulator and sensors. By using the multiple accumulators 20 in a system, the total accumulator volume can be increased.

Figure 2A:
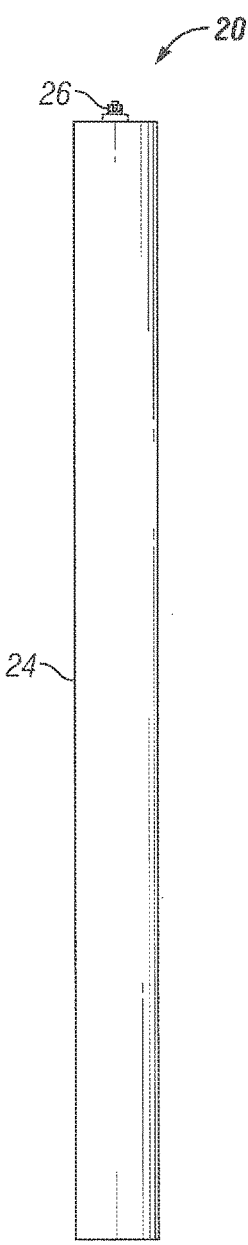
FIG. 2A is a perspective view of an accumulator according to an embodiment of the present technology, including a laser piston position sensor mounted thereon.
Figure 2B:
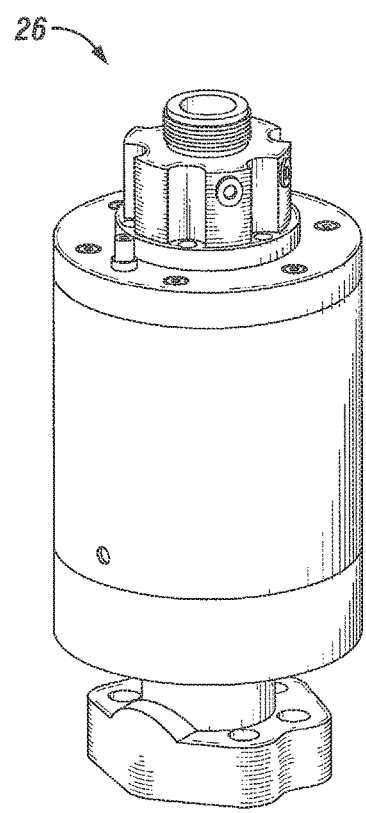
FIG. 2B is an enlarged perspective view of the laser piston position sensor of FIG. 2A.

FIG. 2A depicts an enlarged perspective view of an accumulator 20, according to an embodiment of the present technology. Specifically, there is shown an exterior view of the accumulator housing 24, and an accumulator volume detector in the form of a laser piston position sensor 26. The laser piston position sensor 26, shown in greater detail in FIG. 2B, sits atop the accumulator 20 and directs a laser downwardly into the accumulator toward the accumulator piston (shown in FIG. 3). The laser piston position sensor 26 is attached to the accumulator, such as through the use of common flanges and fittings. As described below, the laser can detect the position of the piston inside the accumulator 20, and can therefor determine the amount of hydraulic fluid in the accumulator 20. Data about the amount of hydraulic fluid in the accumulator 20 in turn can be transmitted to an operator to help the operator to know whether there is sufficient hydraulic fluid in the accumulator 20 to for a particular function to fire.

Figure 3:
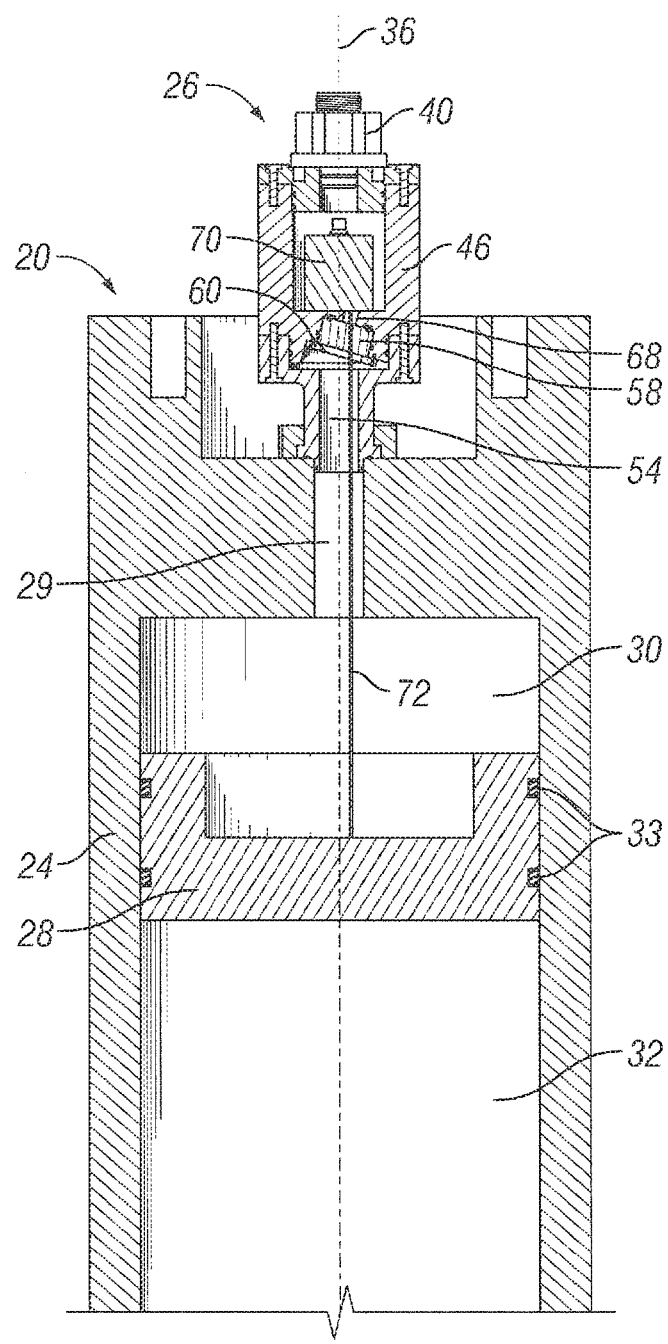
FIG. 3 is a side cross-sectional view of an upper portion of a hydraulic accumulator and a laser piston position sensor according to an embodiment of the present invention.

FIG. 3 depicts a cross-sectional side view of an upper portion of the accumulator 20, with the laser piston position sensor 26 attached to the upper end thereof. This view shows additional accumulator 20 components as well, such as, for example, the accumulator housing 24 and the accumulator piston 28. In the embodiment of FIG. 3, the accumulator housing 24 defines an aperture 29 through an end of the housing. In addition, the accumulator housing 24 is hollow and the accumulator piston 28 spans the inside of the accumulator housing 24 to divide the hollow interior into a first accumulator cavity 30 and a second accumulator cavity 32. The accumulator piston 28 is sealingly engaged with the walls of the accumulator housing 24 so that fluids and gases inside the accumulator housing 24 cannot flow between the first accumulator cavity 30 and the second accumulator cavity 32. Typically, such sealed engagement is accomplished using seals 33, which can be elastomeric seals. In the embodiment shown, the first accumulator cavity 30 can contain a gas, such as, for example, nitrogen or a similarly inert gas. The gas is expandable and compressible, and so can expand and compress as the piston 28 moves up and down relative to the accumulator housing 24 along the longitudinal axis 36 of the accumulator housing 24. The second accumulator cavity 32 is filled with fluid, such as hydraulic fluid.

In operation, the second accumulator cavity is fluidly attached to a function, such as a BOP ram. In its fully charged condition, the second accumulator cavity is filled with hydraulic fluid until the piston 28 is positioned near the top of the accumulator housing 24 (as shown in FIG. 3). Such positioning of the piston 28 reduces the volume of the first accumulator cavity 30, and compresses the gas in the first accumulator cavity 30, thereby increasing the pressure of the gas. In some embodiments, additional gas can be added via a separate gas line (shown in FIG. 5) to further increase pressure in the first accumulator cavity 30.

When an operator desires to use the accumulator 20 to fire a function, such as to close the BOP rams 14, a valve 38 (shown in FIG. 1) can be opened in the hydraulic line 23 between the accumulator 20 and the function. With the valve 38 open, the pressurized gas in the first accumulator cavity 30 expands and pushes the piston 28 downward in the accumulator housing 24. As the piston 28 moves downward, it pushes the hydraulic fluid in the second accumulator cavity 32 out of the accumulator 20, through the hydraulic line 23 connecting the accumulator 20 to the function, and into the function to help fire the function. In some embodiments, the accumulator 20 can be recharged by refilling the second accumulator cavity 32 with hydraulic fluid, thereby pushing the piston 28 toward the top of the accumulator 20, and compressing the gas in the first accumulator cavity 30.

In order for successful firing of a function, it is necessary that the accumulator 20 contain sufficient hydraulic fluid to flow out of the accumulator 20 to the function when the accumulator fires. One way to determine the volume of hydraulic fluid in the accumulator 20 is to determine the position of the accumulator piston 28 within the accumulator housing 28. This is because the second accumulator cavity 32 is filled with hydraulic fluid, which is substantially incompressible, so that the accumulator piston 28 will rise and fall within the accumulator housing 24 according to changes in the volume of hydraulic fluid in the second accumulator cavity 32. Accordingly, certain embodiment of the present technology include the laser piston position sensor 26, mounted at an upper end of the accumulator 20, to determine the position of the accumulator piston 28 within the accumulator 24, as described below.

Figure 4:
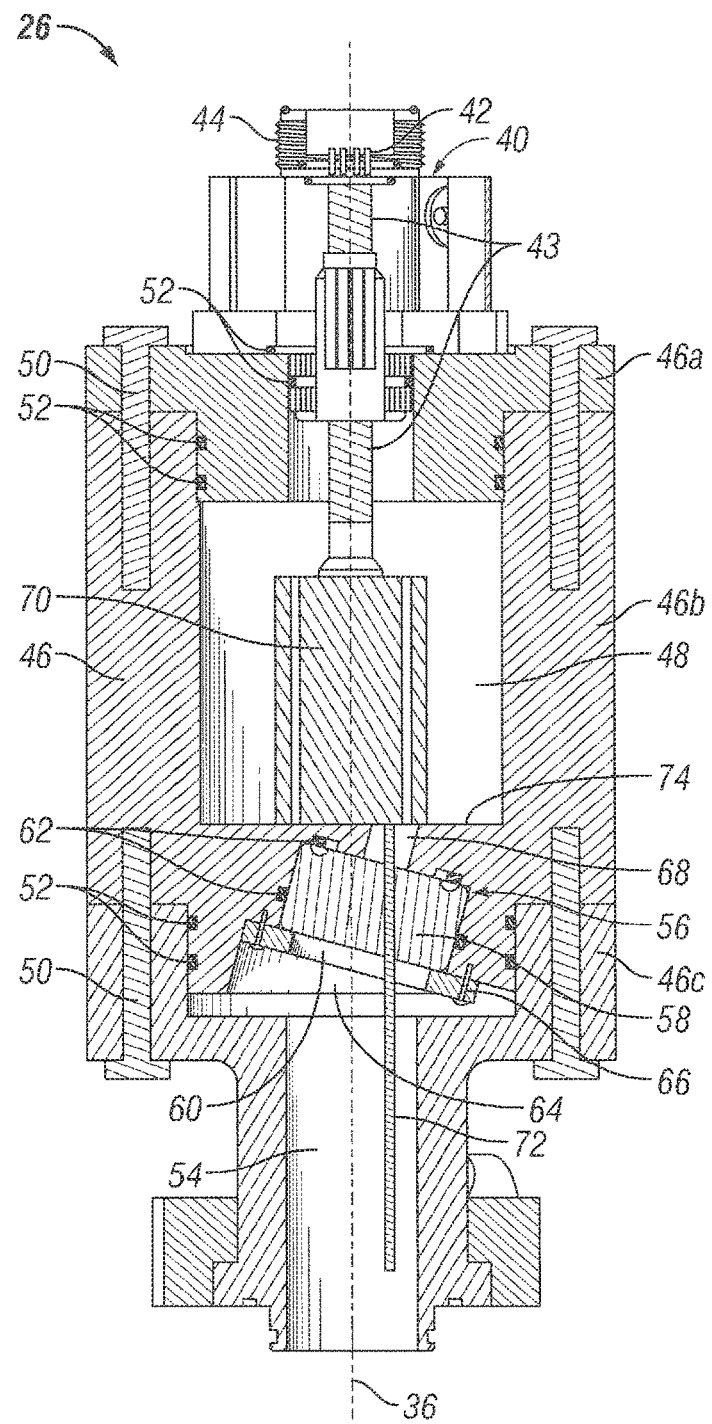
FIG. 4 is an enlarged side cross-sectional view of the laser piston position sensor of FIG. 3.

FIG. 4 shows an enlarged cross-section view of the laser piston position sensor 26 according to one embodiment of the present technology. The laser piston position sensor 26 includes an electronics connector 40 including electronic contacts 42. The electronics connector can have threads 44 that serve to threadedly connect the laser piston position sensor 26 to external subsea cable. A cable 25 (shown in FIG. 1) can connect to the electronic contacts 42, and may provide power to the laser piston position sensor 26. The cable 25 may also serve to relay data from the laser piston position sensor 26 to other parts of the lower stack 10, such as the control pod 18, or even directly to an operator at the sea surface. Such cable 25 can be, for example, a pressure balanced oilfield cable 25, or a molded cable 25, and can carry about 4-20 mA of current. Internal wiring 43 can connect the electronic contacts 42 to the laser sensor 70 (discussed below).

The laser piston position sensor 26 also includes a sensor housing 46. The sensor housing defines a low pressure cavity 48 containing gas (such as inert gas). In some embodiments the gas within the sensor housing can be maintained at a pressure of about 1 atmosphere. As shown, the housing can be composed of multiple housing pieces 46a, 46b, 46c, which can be assembled and fastened together with bolts 50 or other appropriate fastening means. Seals 52 can be positioned between adjacent housing pieces 46a, 46b, 46c to prevent ambient fluid from entering the cavity 48. Seals can also be positioned between the housing 46 and the electronics connector 40. In some embodiments, the seals 52 can be dynamic seals composed of an elastomer or other appropriate material. Although the housing 46 of FIG. 4 is shown with multiple housing pieces 46a, 46b, 46c, alternate embodiments of the present technology may include integral housings without multiple pieces, or may include fewer or more than the three housing pieces depicted in the drawings.

Referring still to FIG. 4, there is shown a hollow connector 54 attached to the sensor housing 46 and, as shown in FIG. 3, oriented toward the first accumulator cavity 30 and piston 28 of the accumulator 20. When the laser piston position sensor 26 is attached to the accumulator housing 24, the hollow connector 54 aligns with the aperture 29 in the end of the accumulator housing 24, so that a laser (described in greater detail below) can pass from the cavity 48 in the sensor housing 46, through the hollow connector 54, and into the first accumulator cavity 30.

The laser piston position sensor 26 also includes a lens assembly 56 positioned between the cavity 48 in the sensor housing 46 and the hollow connector 54. The lens assembly includes a lens 58 that is at least partially transparent, a lens retainer 60 and lens seals 62. The lens assembly 56 is positioned in a recess 64 in the sensor housing 46. During assembly and installation of the laser piston position sensor 26 and hydraulic accumulator 20, one function of the lens retainer 60 is to maintain the position of the lens 58 relative to the sensor housing 46 while the accumulator 20 and laser piston position sensor 26 is brought to the surface, in the scenario that gas from the accumulator has leaked into the cavity 48 in the sensor housing 46. In addition, another function of the lens holder 60 is to hold the lens 58 in place in the recess 64 during installation of the accumulator. To accomplish this, the lens 58 can be placed in the recess 64, with lens seals 62 sealing the interface between the lens 58 and the sensor housing 46. During operation of the laser piston position sensor 46, the lens seals 62 prevent liquid or gas gas typically located in the hollow connector 54 (which is in fluid communication with the first accumulator cavity 30 via aperture 29) from entering the low pressure sensor cavity 48. Thus the lens 58 can act as a barrier between nitrogen or other gas in the first accumulator cavity 30 and the low pressure gas in the cavity 48 of the sensor housing 46. The lens retainer 60 can be attached to the sensor housing 46 with fasteners 66, or by any other appropriate means. An aperture 68 in the sensor housing 46 exposes at least a portion of the lens 58 to the cavity 48 in the sensor housing 46.

Within the cavity 48 of the sensor housing 46 there is positioned a laser sensor 70. The laser sensor 70 performs multiple functions. For example, the laser sensor generates and directs a laser 72 through the aperture 68 in the sensor housing 46, the lens 58, the hollow connector 54 and the aperture 29 in the accumulator housing 24, and into the first accumulator cavity 30 to the piston 28. The laser sensor 70 also receives reflected light returning to the sensor by the same path.

Referring back to FIG. 3, the mode of operation of the laser piston position sensor 26 will now be described. To determine the position of the piston 28 within the accumulator housing 24, the laser sensor 70 generates a laser 72 and directs the laser 72 through the aperture 68 in the sensor housing 46, the lens 58, the hollow connector 54, the aperture 29 in the accumulator housing 24, and the first accumulator cavity 30 to the piston 28. When the laser 72 reaches the piston 28, light from the laser 72 is reflected back along the same path (i.e., through the second accumulator cavity 30, the aperture 29 in the accumulator housing, the hollow connector 54, the lens 58, and the aperture 68 through the sensor housing 46) to the laser sensor 70. Based on the time between emission of the laser 72, and return receipt of the reflected light, the laser sensor 70 can either calculate the distance from the laser sensor 70 to the piston 28, or transmit the required data to a processor at a remote location to calculate such distance. The distance between the laser sensor 70 and the piston 28, in turn, is used to calculate the position of the piston 28 within the accumulator housing 24. The piston 28 position, along with known accumulator dimensional properties, can be used to determine the volume of gas in the first accumulator cavity 30, and the difference between that volume and the total known volume of the accumulator can be used to determine the volume of hydraulic fluid in the second accumulator cavity 32.

In the embodiment shown in FIGS. 3 and 4, the lens 58 is shown angled relative to the laser sensor 70. Such angled orientation serves to prevent or minimize reflection of the laser 72 off the lens 58 during operation of the laser piston position sensor 26. Such reflection could lead to false position readings of the piston 28 in the accumulator housing 24. In the embodiment shown, the lens 58 is angled about 15 degrees relative to the bottom 74 of the cavity 48 in the sensor housing 46, although the lens 58 can alternately be positioned at any appropriate angle.

Figure 5:
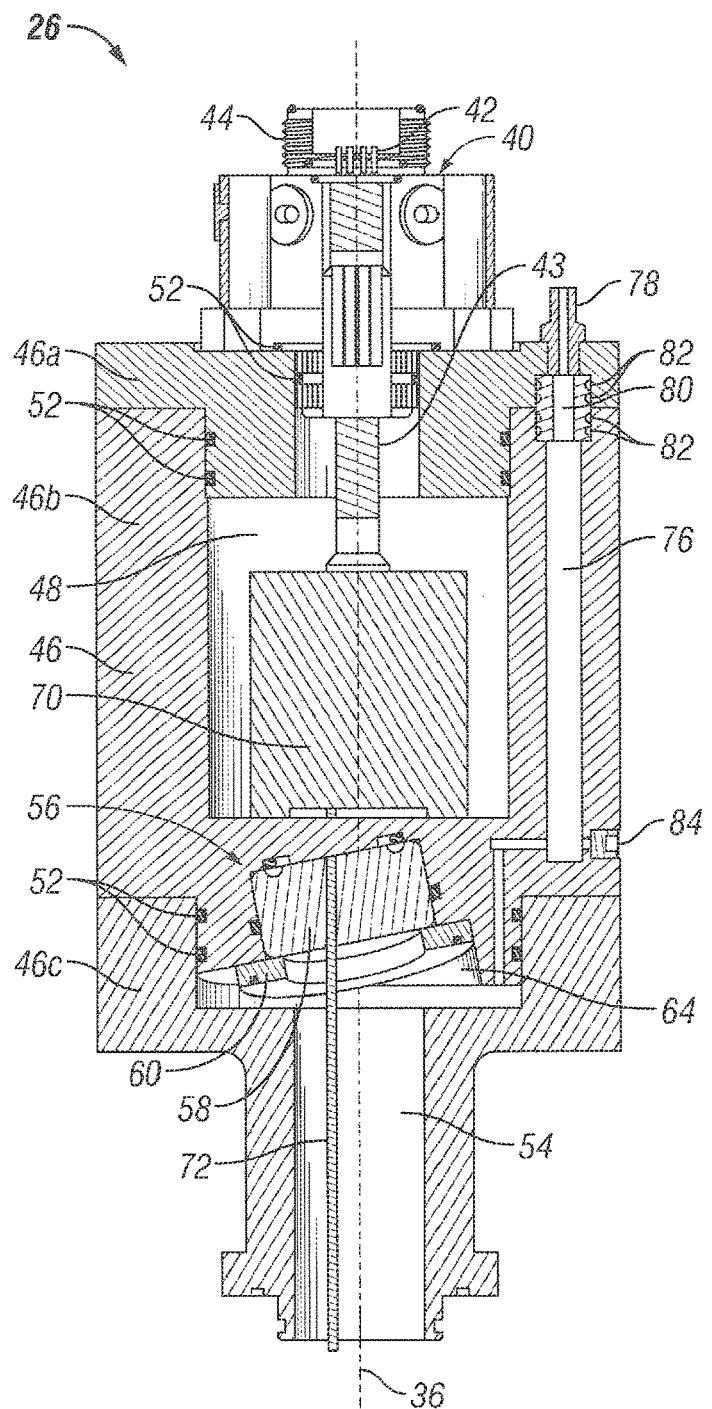
FIG. 5 is an alternate view of the laser piston position sensor of FIG. 4, rotated 180 degrees around its longitudinal axis.

Referring now to FIG. 5, there is shown an alternate view of the laser piston position sensor 26. In the view of FIG. 5, the laser piston position sensor 26 is rotated about its longitudinal axis 36 180 degrees from the view shown in FIG. 4. As shown in FIG. 5, the laser piston position indicator 26 can include a gas fill line 76 with a fill valve 78, a seal sub 80, and a vent plug 84. The gas fill line provides a means of fluid communication between the fill valve 78 and the hollow connector 54, which is in communication with the first accumulator cavity 30 via aperture 29 in the accumulator housing. Thus, the gas fill line 76 can be used to add or take away gas from the first accumulator cavity. The seal sub 80 serves to seal the interface between sensor housing pieces 46a, 46b at the place where the gas line 76 traverses the interface between the pieces 46a, 46b. As shown, the seal sub 80 is surrounded by seals 82 to prevent fluid or gas from passing between the seal sub 80 and the housing pieces 46a, 46b. The fill valve 78 can be a Schrader valve, or any other appropriate type of valve. The vent plug 84 can be opened to release gas from the accumulator to the ambient environment if needed or desired by an operator.

Use of the laser piston position sensor of the present technology provides numerous advantages over the prior art. For example, the laser is requires no physical contact with the piston to measure the position of the piston, is non-invasive to the accumulator, and has no moving parts. These features greatly enhance the reliability of the sensor. Furthermore, the laser piston position sensor of the present technology is adaptable to a wide range of piston accumulators used in many industries and for many different applications.

While the present disclosure has been described with respect to a limited number of embodiments, those skilled in the art, having benefit of this disclosure, can appreciate that other embodiments may be devised which do not depart from the scope of the disclosure as described herein. Accordingly, the scope of the disclosure should be limited only by the attached claims.

What is claimed is:

1. A hydraulic accumulator for use in powering components of a subsea drilling system, comprising:
   an accumulator housing enclosing a cavity, the accumulator housing defining an aperture in a first end, and having a longitudinal axis;
   a piston disposed within the cavity and movable relative to the accumulator housing in a direction parallel to the longitudinal axis; and
   a laser piston position sensor attached to an end of the accumulator housing adjacent the aperture in the first end, comprising:
   a sensor housing enclosing a cavity and defining a recess in an outer surface of the sensor housing, the sensor housing comprising:
      a gas fill line; and
      a gas valve attached to an end of the gas fill line at an outer surface of the sensor housing;
      the gas fill line providing fluid communication from the gas valve into the hydraulic accumulator so that gas can be added to or removed from the hydraulic accumulator;
   a lens positioned in the recess of the sensor housing, and exposed to the cavity in the sensor housing, the lens positioned between the cavity in the sensor housing and the aperture of the accumulator housing; and
   a laser sensor attached to the sensor housing in the cavity, that emits a laser directed through the lens and aperture in the accumulator housing to the piston.

2. The hydraulic accumulator of claim 1, wherein the laser sensor is a receiver that receives light reflected from the piston when the laser contacts the piston.

3. The hydraulic accumulator of claim 2, wherein the laser sensor is in communication with a programmable logic controller that calculates the distance from the laser sensor to the piston based on the time that elapses from when the laser sensor emits the laser to when light reflected from the piston is received.

4. The hydraulic accumulator of claim 1, wherein the lens is positioned at an angle relative to the laser so that the lens does not reflect the laser toward the laser sensor.

5. The hydraulic accumulator of claim 4, wherein the lens is positioned at an angle of about 15 degrees relative to the laser sensor.

6. The hydraulic accumulator of claim 1, wherein the cavity in the sensor housing is filled with gas at a pressure of about 1 atmosphere.

7. The hydraulic accumulator of claim 6, wherein at least a portion of the cavity in the accumulator housing, the aperture in the accumulator housing are filled with an inert gas having a pressure greater than 1 atmosphere.

8. A laser piston position sensor for determining the position of a piston within a hydraulic accumulator, the laser piston position sensor configured to attach to an end of the hydraulic accumulator, and the hydraulic accumulator having an aperture in the end thereof exposing the piston within the hydraulic accumulator to the laser piston position sensor, the laser piston position sensor comprising:
   a sensor housing enclosing a cavity containing a low pressure gas, and defining an opening from the cavity toward the hydraulic accumulator, the sensor housing comprising:
   a gas fill line; and
   a gas valve attached to an end of the gas fill line at an outer surface of the sensor housing;
   the gas fill line providing fluid communication from the gas valve into the hydraulic accumulator so that gas can be added to or removed from the hydraulic accumulator;
   a laser sensor positioned within the cavity for emitting a laser toward the piston of the hydraulic accumulator via the opening in the sensor housing and the aperture in the hydraulic accumulator; and
   a transparent lens positioned between the laser sensor and the hydraulic accumulator to allow passage of the laser from the laser sensor to the piston, and to separate gases in the hydraulic accumulator from gases in the cavity of the sensor housing.

9. The laser piston position sensor of claim 8, wherein the sensor housing defines a recess in an outer surface thereof, and the lens is positioned in the recess.

10. The laser piston position sensor of claim 8, wherein the lens is oriented at an angle relative to the laser sensor to prevent the laser from reflecting back to the laser sensor when the laser passes through the lens.

11. The laser piston position sensor of claim 8, wherein the laser sensor is a receiver that receives light reflected by the piston back to the laser sensor to determine the distance of the piston from the laser sensor based on the time between emitting the laser and receiving the reflected light.

12. The laser piston position sensor of claim 1, further comprising a vent plug connecting the gas fill line with an ambient environment to release gas from the hydraulic accumulator into the ambient environment.

13. The laser piston position sensor of claim 8, further comprising a lens retainer attached to the sensor housing to retain the position of the lens relative to the sensor housing, the lens retainer attached to the sensor housing with fasteners.

14. A method of determining the position of a piston within a hydraulic accumulator, comprising:
   (a) emitting a laser from a laser piston position sensor attached to the hydraulic accumulator;
   (b) directing the laser through an aperture in the hydraulic accumulator to the piston;
   (c) receiving reflected light from the piston;
   (d) determining the amount of time between emission of the laser and receipt of the reflected light;
   (e) based on such time, determining the distance between the laser piston position sensor and the piston;
   (f) determining a volume of hydraulic fluid within the hydraulic accumulator based on the position of the piston within the hydraulic accumulator and dimensional characteristics of the hydraulic accumulator; and
   (g) adding gas to the hydraulic accumulator via a gas line through a portion of the laser piston position sensor.

15. The method of claim 14, further comprising:
filtering the laser through a lens positioned between the laser piston position sensor and the hydraulic accumulator.

16. The method of claim 14, further comprising:
implementing step (f) using a programmable logic controller (PLC).

17. The method of claim 16, further comprising:
implementing step (e) using a PLC.
18. The method of claim 17, further comprising:
implementing step (d) using a PLC.

* * * * *